PALMER & LEEDY.
Bee Hive.
No. 30,341. Patented Oct. 9, 1860.
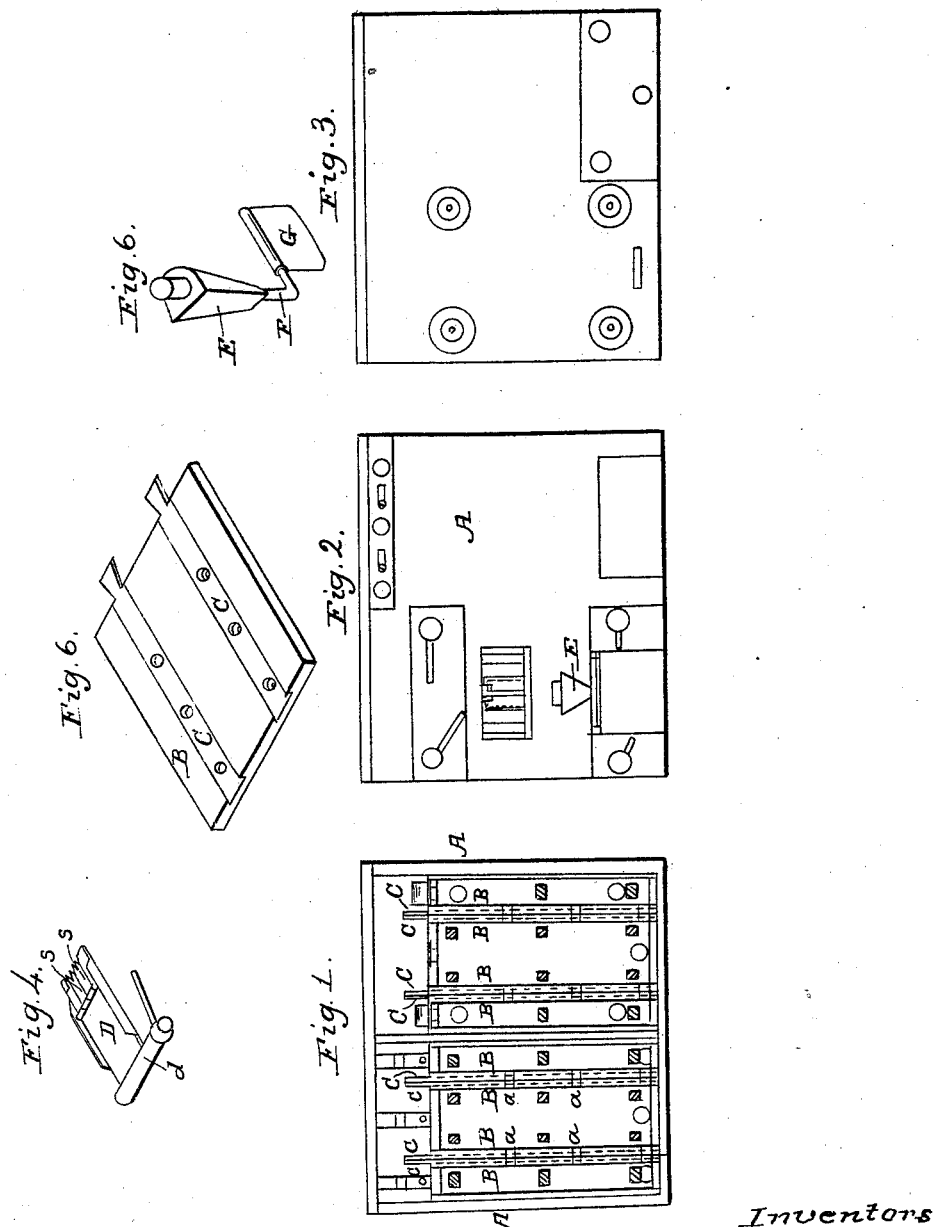

UNITED STATES PATENT OFFICE.

J. W. PALMER, OF PORT REPUBLIC, AND J. K. LEEDY, OF TOMS BROOK, VIRGINIA.

BEEHIVE.

Specification of Letters Patent No. 30,341, dated October 9, 1860.

*To all whom it may concern:*

Be it known that we, JOHN W. PALMER and JOHN K. LEEDY, the former of Port Republic and the latter of Toms Brook, in the State of Virginia, have invented certain new and useful Improvements in Beehives; and we do hereby declare that the following is a full, clear, and exact description of the same, reference being had to the accompanying drawings and to the letters of reference marked thereon.

In the annexed drawings Figure 1 is a vertical cross section. Figs. 2 and 3 are side views. Fig. 4 is a view of the bee gate. Fig. 5 is a view of a partition and its slides. Fig. 6 is a view of the feed arrangement.

In the drawings A, represents the body of the hive, which is a box constructed in any suitable manner. This box may be made large enough to contain only one swarm of bees, or it may be made larger and divided so as to contain as many swarms as may be desirable. The different hives are divided by means of partitions B B and the bees may be allowed to pass about from one apartment of the hive to another through the openings *a, a,* in said partitions. The partitions B B are constructed with dovetail grooves in one of their sides, and slides C C are made to fit into these grooves. The slides are made with holes in them to correspond with the holes in the partitions, as represented in Fig. 1. In forming an apartment two of these slides are put together so that the openings range as shown, the partitions B B being placed back to back.

The object in using two partitions in forming apartments is that the bees may not be able to fasten their glue and wax over the joint between the partition and the slide, thus preventing the working of the slides. When the two partitions are turned back to back and the slides are secured in dovetailed grooves in the sides which are turned toward each other, the bees cannot get at the said slides and cannot prevent their operation.

E represents a funnel shaped feed box which has connected with it a bent tube F. A bag G is secured to this tube in such a manner that when feed is placed in the hopper or feed box E it passes down through the pipe F into the bag. The bees feed through the meshes of the bag, or upon the food which passes through and comes upon the outside of the bag.

Having thus fully described our invention, what we claim as new and desire to secure by Letters Patent is—

1. The combination of the partitions B B and the slides C C, each being provided with openings which correspond, the partitions being provided with dovetail grooves upon one side for receiving the slides two being placed back to back with the slides together, substantially as and for the purpose specified.

2. The funnel shaped box E, the pipe F, and the bag G, when the same are arranged in the manner and used for the purpose of making a bee feeder, substantially as set forth.

In witness that we claim the above we have hereunto set our hands before the subscribing witnesses.

JOHN W. PALMER.
JOHN K. LEEDY.

Witnesses:
JOHN W. LEE,
JAS. A. LEWIS.